United States Patent Office 2,807,779
Patented Sept. 24, 1957

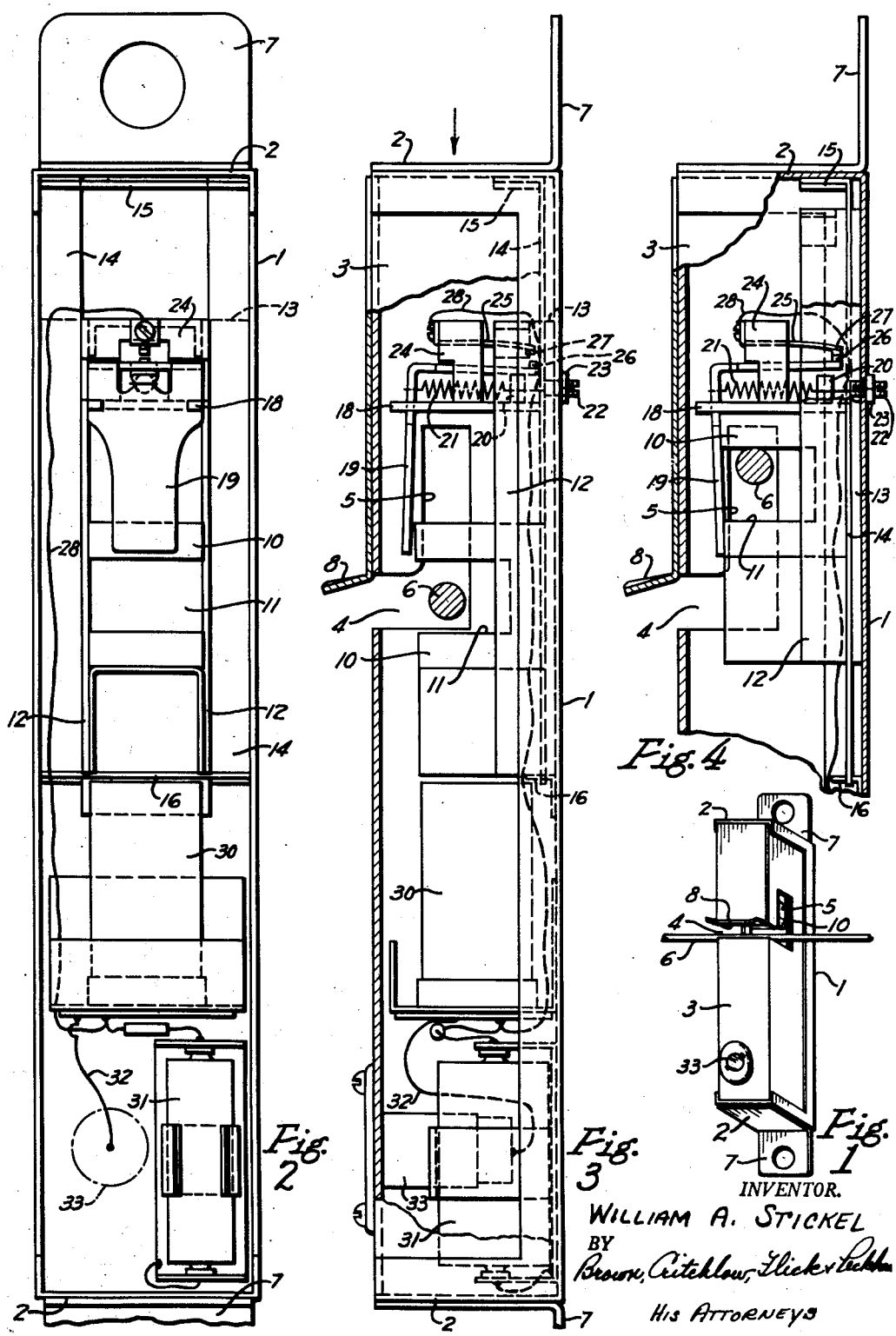

2,807,779

ELECTRIC LINE FAULT LOCATOR

William A. Stickel, Pittsburgh, Pa.

Application October 29, 1956, Serial No. 618,948

7 Claims. (Cl. 324—52)

This invention relates to apparatus for determining in what section of an electric line a fault has developed.

In electric lines, particularly outside lines, a short circuit (meaning also a ground) sometimes develops which blows a fuse. The problem then arises as to where the short circuit occurred. It often requires a long search or the use of expensive equipment to locate the fault, especially if there are several branch lines running off the main line.

It is among the objects of this invention to provide a line fault locator which is of simple and inexpensive construction, which can be used satisfactorily by unskilled personnel, which is quickly and easily attached to and detached from an electric line, and which permits a fault in the line to be located quickly.

In accordance with this invention, the fault locator includes a pole piece that is provided with a recess adapted to receive an electric line between a suspected point of short circuiting and the fuse that was blown by the fault. An armature is normally spaced from the pole piece but is adapted to be drawn toward it for a moment if the blown fuse is replaced by a new one while the fault locator is connected to the portion of the electric line that is short circuited and which therefore will carry an excessive current momentarily before it blows the new fuse. When the armature is moved toward the pole piece it actuates a signal to show that the line passing through the pole piece was energized with an abnormal current. It is then evident that the line must be shorted at the side of the locator opposite the blown fuse. If the signal is not actuated, it will be clear that the line fault is located between the locator and the fuse.

The preferred embodiment of the invention is illustrated in the accompanying drawings, in which Fig. 1 is a perspective view of my fault locator;

Fig. 2 is an enlarged front view thereof, with the cover removed;

Fig. 3 is a side view, with most of the near side of the cover broken away;

Fig. 4 is a fragmentary view, similar to Fig. 3, showing the locator in operative position.

Referring to Fig. 1 of the drawings a vertical case is provided, generally of metal, which is tall relative to its horizontal cross sectional area. The case has a back 1, upper and lower ends 2, and a front cover 3. The front of the case has a slot 4 extending across it and part way back through the opposite sides of the cover. Extending upward from the inner ends of the slot are vertical slots 5. These slots are wide enough to freely receive a short straight portion of any electric line 6 (Figs. 3 and 4), with which this device may be used. Brackets 7 may be secured to the upper and lower ends of the case for attaching it to a pole (not shown) so that it can be lifted high enough to hook it over wire 6. To help guide the wire into the front slot 4, the front of the case may be provided with a forwardly extending lip 8 at the top of the slot.

Normally disposed directly behind the front slot 4 of the case is a pole piece 10, as shown in Fig. 3, which is U-shaped to provide a recess 11 between its upper and lower legs for receiving the line 6. This pole piece is slidable toward the upper end of the case from the position just mentioned. The sliding connection with the case can be formed in various ways, one way being to mount the pole piece between a pair of vertical rails 12 that have outwardly projecting flanges 13 slidably mounted between vertical metal strips 14 and the back of the case. The opposite ends of these strips are fastened to the case by cross bars 15 and 16. The strips are wide enough to prevent the rails from moving sideways.

About half way between the lowered pole piece and the top of the case there is a bracket 18 secured to the back of the case and projecting forward from between the rails. Rockably mounted on the front end of this bracket is an armature 19 that preferably is L-shaped. One leg of the armature extends from the bracket down in the case and may overlap the upper end of the lowered pole piece. The upper leg of the armature extends back toward the back of the case, and its rear end is urged downward against a stop 20 by a coil spring 21 fastened to the front of the armature above the bracket and extending back and across the stop to a screw 22 loosely mounted in the back of the case. A nut 23 is mounted on the screw and is pulled forward against the back of the case by the spring. Consequently, the lower end of the front of the armature is urged forward away from the pole piece, as shown in Fig. 3. When the case and bracket 18 are moved downward relative to the pole piece, both legs of the pole piece will be located behind the front leg of the armature, which then spans the gap between the pole piece legs, as shown in Fig. 4.

As previously mentioned, it will be seen that the case can be hooked over an electric line 6 so that the line will extend through the recess 11 in the pole piece. By then pulling downward on the case, the armature will be lowered into operative position across the pole piece recess. If enough current is then passed through the line to overcome the resistance of spring 21, the line will serve as a single turn coil which, with the pole piece, will become an electromagnet that will draw the armature back against the pole piece. It is this movement of the armature that is used to actuate a signal, either visual or audible.

The preferred way of producing a signal is to mount an insulating block 24 on top of bracket 18 and to extend a spring metal strip 25 rearwardly from the block above the upper leg of the armature, which carries an electric switch contact 26 at its rear end normally spaced a short distance below a similar switch contact 27 on the rear end of its spring strip. The front end of the spring strip is connected by a wire 28 to the actual signal device, which may be, for example, a battery operated flash unit such as used with cameras. In such a case the unit, including a condenser 30 and battery 31, may be mounted in the case below the pole piece and connected by a wire 32 with a flash bulb socket 33 secured to the front of the case. This socket is adapted to receive a flash bulb (not shown) which will project from the cover. The other side of the signal circuit is grounded through the metal case, so that the armature forms part of the electric switch which normally is open. When the switch is closed by engagement of the two contacts 26 and 27, the circuit to the flash bulb is energized by the battery and the bulb is flashed.

In using this device, a man hangs it on an electric line between a point where he suspects the fault may be located and the fuse that was blown when the short developed. He then replaces the fuse with a new one, and the line between it and the fault will immediately be energized, but only for a moment because the current will promptly build up enough to blow the fuse. If the short circuit is between the fuse and the fault locator, or if it is in a wire that connects with the section of the line between the fuse and the locator, either no current or only normal current will flow through the piece of wire supporting the locator. Such current will not be enough to cause the pole piece to attract the armature, so the flash bulb will not be energized. On the other hand, if the fault is beyond the fault locator, the high or excessive current flowing across the locator momentarily when a new fuse is put in the line will cause the pole piece to attract the armature and thereby fire the flash bulb. Whether or not the flash is seen, the appearance of the bulb will show whether or not it has been fired. If it has, then the man will know that the fault is farther out along the line; that is, on the side of the locator opposite the blown fuse. The same operation can be repeated at other points along the line until the fault is tracked down. If the locator is hung on a branch line and the flash bulb is fired, the man will know that the fault is in that branch. This in itself will greatly narrow the field of search for the actual short circuit. Although a single locator may be placed in successive positions as just indicated, it will be quicker to use several locators at the same time and hang them in different positions on the main line and on branch lines. By observing the fired flash bulbs after a new fuse has been placed in the line, it is a simple matter to trace the general or specific location of the fault. By adjusting nut 23 along screw 22, the fault locator can be adjusted for operation with currents of various amperage, so that it will not function unless a current of a given intensity flows through wire 6 in the pole piece recess.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A line fault locator comprising a pole piece provided with a recess adapted to receive an electric line between a blown fuse therein and a suspected point of short circuiting, an armature normally spaced from said pole piece and adapted to be drawn toward it if the line in the pole piece carries the excess current that is created momentarily in the line between the line fault and the fuse when the blown fuse is replaced, and a signal actuated by the armature when it moves toward the pole piece, whereby it will be shown that the line fault is located at the side of said locator opposite the blown fuse.

2. A line fault locator comprising a pole piece provided with a recess adapted to receive an electric line between a blown fuse therein and a suspected point of short circuiting, an armature normally spaced from said pole piece and adapted to be drawn toward it if the line in the pole piece carries the excessive current that is created momentarily in the line between the line fault and the fuse when the blown fuse is replaced, a battery signal circuit, and a normally open electric switch in said circuit actuated by the armature when it moves toward the pole piece to close said circuit so that it will be clear that the line fault is located at the side of said locator opposite the blown fuse.

3. A line fault locator comprising a pole piece provided with a recess adapted to receive an electric line between a blown fuse therein and a suspected point of short circuiting, an armature normally spaced from said pole piece and adapted to be drawn toward it if the line in the pole piece carries the excessive current that is created momentarily in the line between the line fault and the fuse when the blown fuse is replaced, a battery circuit adapted to receive a flash bulb, and a normally open electric switch in said circuit adapted to be closed by the armature when it moves toward the pole piece, whereby the flash bulb will be flashed to show that the line fault is located at the side of said locator opposite the blown fuse.

4. A line fault locator comprising a pole piece provided with a recess adapted to receive an electric line between a blown fuse therein and a suspected point of short circuiting, an armature normally spaced from said pole piece and adapted to be drawn toward it if the line in the pole piece carries the excessive current that is created momentarily in the line between the line fault and the fuse when the blown fuse is replaced, a signal actuated by the armature when it moves toward the pole piece, whereby it will be shown that the line fault is located at the side of said locator opposite the blown fuse, and adjustable means controlling movement of the armature toward the pole piece.

5. A line fault locator comprising a pole piece provided with a recess adapted to receive an electric line between a blown fuse therein and a suspected point of short circuiting, an armature pivotally mounted at one side of the pole piece and having one end adapted to be drawn toward it if the line in the pole piece carries the excessive current that is created momentarily in the line between the line fault and the fuse when the blown fuse is replaced, an electric contact adjacent the opposite end of the armature and adapted to be engaged by that end when the other end is drawn toward the pole piece, a battery circuit including the armature and contact, and signal means in said circuit adapted to be energized when the armature engages the contact, whereby to show that the line fault is located at the side of said locator opposite the blown fuse.

6. A line fault locator according to claim 1, in which said pole piece is slidable away from the armature to expose said recess for reception or release of an electric line.

7. A line fault locator comprising an upright case provided with a transverse slot in its front and with vertical slots in its sides extending upwardly from the transverse slot, said slots being adapted to receive an electric line between a blown fuse therein and a suspected point of short circuiting, whereby the case will hang on the line, a pole piece in the case normally behind said transverse slot and provided with a recess for receiving said line, an armature mounted in the case in front of said vertical slots above the pole piece recess, the case being slidable downwardly on the pole piece to move the armature down across the front of said recess, the lowered armature being adapted to be drawn toward the pole piece behind it if the line in the pole piece carries the excessive current that is produced momentarily in the line between the line fault and the fuse when the blown fuse is replaced, and a signal actuated by the armature when it is drawn toward the pole piece.

References Cited in the file of this patent
UNITED STATES PATENTS 857,262  Torchio _____ June 18, 1907